United States Patent [19]
Laurance et al.

[11] 3,884,907
[45] May 20, 1975

[54] REGENERATED CELLULOSE RECOVERY PROCESS USING A HUMID GAS TO REMOVE COATING SOLVENT

[75] Inventors: Dale Roderic Laurance; Richard Dale Roe; Robert Gene Sheppard, all of Lawrence, Kans.

[73] Assignee: E. I. du Pont de Nemours & Company, Wilmington, Del.

[22] Filed: Sept. 5, 1974

[21] Appl. No.: 503,501

[52] U.S. Cl. .................................. 260/212; 264/37
[51] Int. Cl. ............................................ B29h 19/00
[58] Field of Search ..................... 260/212; 264/37

[56] References Cited
UNITED STATES PATENTS

| | | | |
|---|---|---|---|
| 2,337,928 | 12/1943 | Reichel | 264/37 |
| 2,948,918 | 8/1960 | Austin | 264/37 |
| 3,344,212 | 9/1967 | Francis | 264/37 |
| 3,758,457 | 9/1973 | TenBroeck et al. | 260/212 |

FOREIGN PATENTS OR APPLICATIONS

| | | | |
|---|---|---|---|
| 532,079 | 10/1956 | Canada | 260/212 |
| 542,803 | 6/1957 | Canada | 260/212 |

*Primary Examiner*—Ronald W. Griffin

[57] ABSTRACT

In a regenerated cellulose recovery process wherein (1) coated, softened, regenerated cellulose is comminuted, (2) the softener is removed leaving coated regenerated cellulose having open internal pores, (3) the coating is removed from the regenerated cellulose by flushing with a coating solvent, and (4) the regenerated cellulose is dried of coating solvent, the improvement wherein the regenerated cellulose is dried of coating solvent by contacting the regenerated cellulose having a solvent content of at least about 6% by weight at an elevated temperature with a gas stream containing an effective amount of water vapor to raise the regenerated cellulose water content to about 7 to 22 percent by weight and to reduce the coating solvent content of the regenerated cellulose. In a preferred embodiment, steam is selected as the gas stream and residual coating solvent is reduced to less than about 1 percent by weight.

21 Claims, 2 Drawing Figures

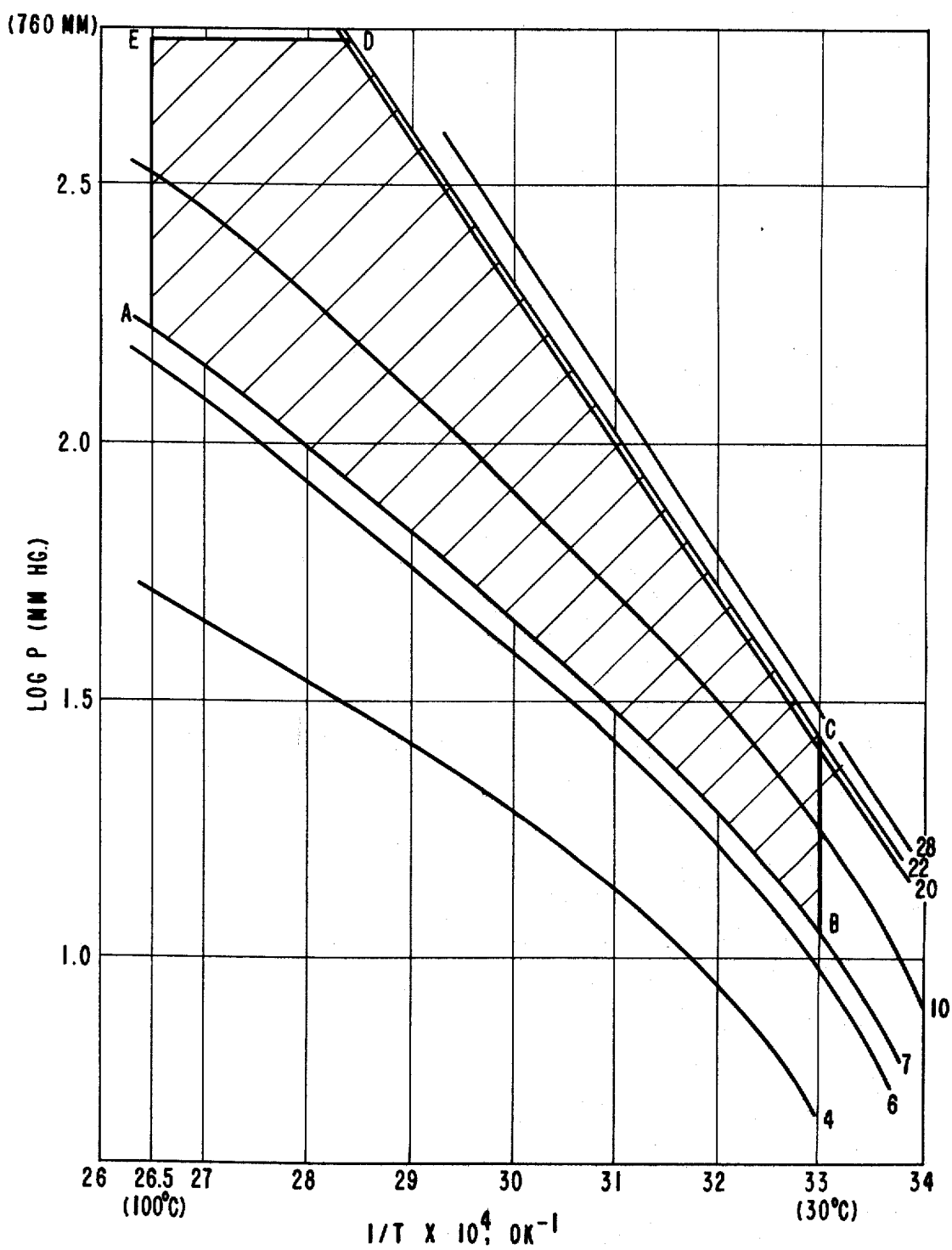

3,884,907

REGENERATED CELLULOSE RECOVERY PROCESS USING A HUMID GAS TO REMOVE COATING SOLVENT

BACKGROUND OF THE INVENTION

This invention relates to an improved process for the recovery of regenerated cellulose from coated and softened regenerated cellulose waste, and more particularly relates to an improved process wherein, after the coating has been removed from the waste by a coating solvent, the level of coating solvent in the regenerated cellulose is reduced by contacting the solvent-laden regenerated cellulose with a humidified gas stream.

Manufacture of regenerated cellulose by the viscose process is well known in the art and needs no explanation. Regenerated cellulose so produced is commonly softened (plasticized) with a glycerine or propylene glycol water solution, dried, and coated with an organic coating such as a vinylidene chloride copolymer (saran) to reduce its gas permeability and improve its moisture-proof quality, heat sealability, and dimensional stability. The softened and coated regenerated cellulose has long been used as a packaging film.

With the present and projected shortages of raw materials, it is an objective of the industry to reclaim off-standard product and waste accumulated as the manufactured film is trimmed and slit to fill customer orders. Toward this end, recently issued U.S. Pat. No. 3,758,457 to TenBroeck et al. discloses a process for the recovery of regenerated cellulose, softener and coating from such waste materials by a. comminuting the waste,
b. adding water to the comminuted waste,
c. extracting the water and softener with an extraction agent,
d. drying the waste to remove the extraction agent,
e. removing the coating with a coating solvent,
f. adding water and additional coating solvent to form a waste slurry, and
g. drying the regenerated cellulose with a stream of gas to selectively remove the coating solvent and excess water.

Drying step (g) takes advantage of the affinity of cellulose for water, which increases with decreasing temperature, and the relatively high vapor pressure of the solvent. Solvent is selectively evaporated as drying commences, depressing the cellulose temperature and promoting displacement of solvent with water in the cellulose pores. When the solvent has been removed, the cellulose returns to the gas stream ambient temperature and the cellulose water content eventually drops to equilibrium with the gas stream.

While this process gives excellent results, the drying rates are often slower than desired and the slurry drying step poses process control problems. Since the slurry is cast on a porous surface as a cake and the drying gas passes through the cake, deviations in cake thickness cause the gas to preferentially pass through thin sections of the cake, leading to inadequate drying of the thicker portions and/or over-drying of the thinner portions. Moreover, the drying gas must be supplied to the cake in a controlled manner to overcome the tendency of the gas to pass through partially dried rather than solvent-wet portions of the cake. Furthermore, gas velocity and temperature must be carefully controlled.

Complex equipment is thus needed, especially when the process is conducted continuously, to recover a uniformly dried product and there is a need for an improved process overcoming the difficulties encountered in slurry drying.

SUMMARY OF THE INVENTION

It has now been found that the regenerated cellulose recovery process of U.S. Pat. No. 3,758,457 is improved by substituting a humidified gas-drying operation for the slurry drying described therein. Accordingly, the present invention provides in a regenerated cellulose recovery process wherein (1) coated, softened, regenerated cellulose is comminuted, (2) the softener is removed leaving coated regenerated cellulose having open internal pores, (3) the coating is removed from the regenerated cellulose by flushing with a coating solvent, and (4) the regenerated cellulose is dried of coating solvent, the improvement wherein the regenerated cellulose is dried of coating solvent by contacting the regenerated cellulose having a solvent content of at least about 6 percent by weight at an elevated temperature with a gas stream containing an effective amount of water vapor to raise the regenerated cellulose water content to about 7 to 22 percent by weight and to reduce the coating solvent content of the regenerated cellulose. The regenerated cellulose can be heated solely by contact with the drying gas or by such contact in conjunction with auxiliary heating, and liquid water can be added to the regenerated cellulose prior to or during contact with the drying gas stream to supply a portion of the moisture absorbed by the regenerated cellulose.

Moreover, the solvent-laden regenerated cellulose can be predried to reduce the drying load imposed on the humid gas drying equipment.

The process can be used to remove conventional coatings such as ethyl vinyl acetate, nitrocellulose, waxes, acrylates, polyvinyl chloride, and vinylidene chloride copolymer coatings, and the solvent used to remove the coating, from waste regenerated cellulose. The process is especially useful for the removal of vinylidene chloride copolymer coatings and will hereinafter be further described with respect to such removal.

BRIEF DESCRIPTION OF THE DRAWINGS

FIG. 2 is a graph showing permissible ranges of temperatures and water vapor partial pressures in the gas stream employed in practicing the invention when using a gas stream having a pressure of one (1) atmosphere.

DESCRIPTION OF THE PREFERRED EMBODIMENTS

Figure 1:
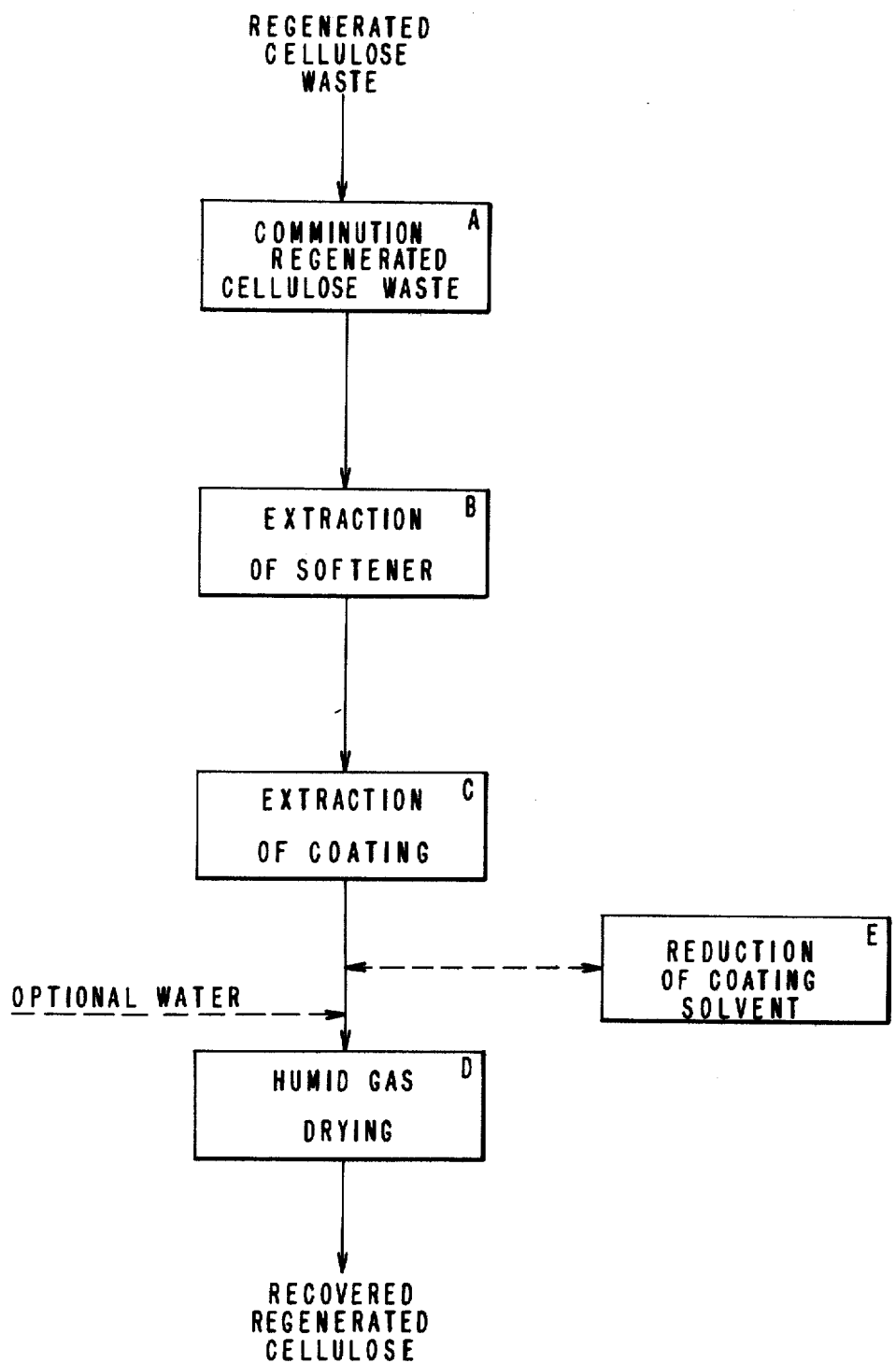
FIG. 1 is a block diagram illustrating the flow-through process of a preferred embodiment.

Vinylidene chloride copolymer coatings have long been used in the art to improve the barrier properties, heat sealability, and dimensional stability of regenerated cellulose film used in the packaging industry. These copolymers are well known in the art and generally are obtained by polymerizing a mixture of from 80 to 96.5 parts by weight of vinylidene chloride, from 0.1 to 5 parts by weight of itaconic acid, and from 3 to 19 parts by weight of at least one monomer selected from the group consisting of acrylonitrile, alkyl esters of acrylic and methacrylic acids having from 1 to 18 carbon atoms in the alkyl group, phenyl methacrylate, cyclohexyl methacrylate, p-cyclohexyl-phenyl methacrylate, methacrylonitrile, methyl vinyl ketone, and vinyl chloride. The particular vinylidene chloride copolymer coating is not critical to the present invention, and the present process can be used to remove the enumerated and other vinylidene chloride copolymer coatings from regenerated cellulose wastes.

Coating solvents which can be selected to advantage have boiling points lower than that of water since the process is drastically slower with higher boiling solvents. Representative useful solvents include tetrahydrofuran (THF), acetone, methyl ethyl ketone, ethyl acetate, or dimethyl formamide. Since THF is the preferred solvent, the invention will further be described with respect thereto.

Referring now to FIG. 1, the collected regenerated cellulose waste is first reduced in size as represented by Block A so that the softener and coating materials can be successfully extracted. Typically, the waste is comminuted by a device such as a rotary knife and stationary screen into chips which will pass through a No. 16 U.S. sieve series screen.

Then, as represented by Block B, water is generally added to the chips, swelling the chips to enhance the efficiency of softener extraction; the softener and water are extracted using an extraction agent such as methanol, acetone, ethanol, propanol, or n-butanol; and the chips are dried of residual extraction agent. Softener extraction is generally conducted by selecting an extraction agent and process conditions which reduce the residual softener level in the dried chips to less than about 0.2 percent by weight since residual softener will appear as a contaminant in the subsequently recovered coating (Block C). The softener and extraction agent are recovered from the extract for recycle using conventional techniques, e.g., rectification.

After removal of the softener, and as represented by Block C, the coating is extracted from the chip surface by dissolving with a coating solvent such as THF. The degree of coating removal depends on the quality requirements of regenerated cellulose products made from the recovered material. Where product color and quality is important, little, if any, coating should remain on the chips. The extracted coating solution is generally recycled for use in coating regenerated cellulose.

Further details of the process steps represented by Blocks A, B, and C are disclosed in U.S. Pat. No. 3,758,457, incorporated herein by reference.

The regenerated cellulose chips from the coating extraction step have an open gel structure and are saturated with THF. Subsequent steps in the recovery process are selected to retain the open gel structure, thereby recovering a highly reactive regenerated cellulose, while reducing the THF content typically to less than about 1 percent, based on dry chip weight, thereby maximizing THF recovery and avoiding the problems commonly associated with higher levels of residual solvent. In accordance with the present invention, these objectives are accomplished by contacting the solvent-laden cellulose at elevated temperatures with a humidified gas stream. The gas stream not only provides water for the cellulose, but also contributes heat to assist in solvent drying as discussed hereinafter.

Regenerated cellulose has a natural affinity for water and reaches a moisture content in equilibrium with water vapor, the cellulose equilibrium water content varying with the cellulose temperature and water vapor partial pressure. This relationship is illustrated by FIG. 2, based on studies of Simril and Smith (Industrial and Engineering Chemistry, Vol. 34, No. 2., 1942) incorporated herein by reference, wherein various equilibrium water contents are plotted as a function of cellulose temperature, recorded on the abscissa as $1/T \times 10^4$ where T is in degrees Kelvin, and as a function of the water vapor partial pressure, recorded on the ordinate as the log of the vapor pressure in mm. Hg.

To displace THF in the inner cellulose structure with water, in order to permit drying of the cellulose to less than 1 percent residual THF, it is necessary to raise the cellulose moisture content to at least 7 percent by weight, based on the dry cellulose weight. The adsorption line labeled AB defines the combinations of water vapor pressure and cellulose temperature required to achieve this desired displacement.

It is also desired to recover a cellulose having a relatively low moisture content, such as no more than about 10 to 20 percent water based on the dry cellulose weight. If the cellulose water content is permitted to exceed about 22 percent and the cellulose is subsequently dried to a lower moisture content, it has been found that the cellulose gel structure has a tendency to collapse. To prevent this from occurring, the cellulose water content is maintained below the adsorption line labeled DC.

Although any equilibrium moisture content between the curves AB and DC can be selected, the process is generally operated within a temperature range of about 30° to 100°C. since drying rates of the coating solvent improve with increasing temperature and it is generally desired to not expose the cellulose to temperatures above about 100°C. Lines BC and AE thus define the preferred drying temperature range. In a similar manner, it is generally preferred to operate the process at atmospheric pressure to avoid the more complex equipment designs required by superatmospheric drying. Line ED defines atmospheric pressure, corresponding to a gas stream which is 100 percent water vapor.

When the solvent-laden regenerated cellulose is contacted with the humidified gas stream, the latent heat from water vapor condensing on the cellulose, together with sensible heat transferred to the cellulose from the gas stream, is available for evaporating the THF solvent. In many cases, and especially when the cellulose is heavily laden with solvent, an external source of heat is also provided to expedite the drying and control the cellulose temperatures. External heat is readily provided by installing a steam jacket on the drying vessel or heating coils or dielectric heaters within the drying chamber.

The particular gas stream selected as a medium for the water vapor is not critical and can be any gas inert to the cellulose and capable of serving as a carrier of water vapor in the amounts prescribed between lines AB and DC. Humid air, or preferably a humidified fire-suppressing gas stream such as nitrogen or carbon dioxide, can be selected with advantage where precise control is desired over a broad range of final cellulose moisture contents since such control can be achieved by varying the gas stream relative humidity. Steam, however, is preferred when drying time is the dominant consideration since the high heat transfer rates obtained with steam increase the cellulose drying rate. When steam is selected, final cellulose moisture content is controlled by the steam temperatures and superheated steam can be used without danger of discoloring the regenerated cellulose due to the short drying period.

Since the solvent-laden chips from the coating removal step may contain as much as 400 percent, or more, THF by weight on a cellulose basis, the solvent-laden chips are generally predried to a THF content less than about 200 percent, preferably less than 50 percent, by weight based on dry chip weight, as represented by Block D of FIG. 1. Predrying, if used, will not reduce the solvent content to less than about 6 percent by weight, based on the cellulose weight.

The predrying step is a simple physical removal of solvent and is used to reduce the drying load imposed on the humidified gas dryer. One method of predrying, which can be used to advantage, involves spreading the solvent-laden cellulose on a screen and passing a high-velocity stream of an inert gas, such as nitrogen, through the cellulose to entrain and remove liquid solvent. Alternatively, the solvent-laden cellulose can be passed through a pair of rolls to express solvent therefrom. Other methods will be evident to those skilled in the art.

In another embodiment, a portion of the final water content of regenerated cellulose can be supplied by adding liquid water to the solvent-laden cellulose prior to or during contact with the humid gas. This prior addition of liquid water has the advantage of reducing the time needed to dry the cellulose to the desired moisture content while still taking advantage of the benefits afforded by humid gas drying. For instance, the drying time can be significantly reduced by adding about 50 to 100 percent of the cellulose water requirements as liquid water. It will be appreciated that after the added water has reached a certain level, which will vary with the particular gas stream selected to accomplish drying and the quantity of solvent to be removed, condensing water vapor from the gas stream will not provide sufficient heat to vaporize all the solvent and it may be necessary to additionally heat the gas stream or otherwise provide additional heat as hereinbefore described.

Any conventional equipment can be used for contact of the cellulose during the drying step. Thus, rotary drying equipment, cylinder dryers, tunnel dryers, fluidized dryers, through circulation screen dryers, or the like can be used to advantage. Solvent evolving from the solvent-laden regenerated cellulose is carried off with the gas stream and is readily recovered for reuse using conventional methods such as by condensing the dryer off-gases and distilling or extracting the solvent from the condensate.

As mentioned hereinbefore, the water content of the recovered regenerated cellulose will be between about 7 to 22 percent depending on the drying conditions. Thus, it is possible to control the moisture content to that desired in the cellulose for recycle to the viscose process or manufacture of products such as carboxymethyl cellulose. The recovered regenerated cellulose will typically contain less than about 1% by weight coating solvent and, if desired, 0.3 percent or less coating solvent.

The invention will now be further illustrated by the examples wherein all percentages are by weight based on the dry weight of the regenerated cellulose.

EXAMPLE 1

Regenerated cellulose waste coated with a vinylidene chloride copolymer and softened with propylene glycol is comminuted, treated with water and ethanol to extract the glycol softener, and flushed with tetrahydrofuran to remove the coating, as described in U.S. Pat. No. 3,758,457. Resulting regenerated cellulose has a tetrahydrofuran content of about 900 percent and a water content of less than about 1 percent.

The regenerated cellulose is then predried by placing the chip/solvent mixture in a Buchner funnel and passing a stream of dry $N_2$ at approximately 70°F. through the cake at a velocity of 100 feet/minute for at least 30 seconds. The THF is reduced to approximately 9 percent and the water to less than about 1 percent in the predried chips. The cellulose layer is held at about ½ inch during this operation. Humidified nitrogen having a relative humidity of 85 percent and a temperature of about 54°C. is then passed through the regenerated cellulose layer at a superficial velocity of 10 feet/minute for 70 minutes. At the end of 70 minutes, the regenerated cellulose has a moisture content of about 15 percent and a tetrahydrofuran content less than 1 percent.

EXAMPLE 2

Regenerated cellulose having a tetrahydrofuran content of about 400 percent and a water content less than 1 percent is obtained by removing the softener and coating as described in U.S. Pat. No. 3,758,457. The regenerated cellulose is then predried by passing the solvent/chip mixture over a rotary vacuum filter using nitrogen at 80°C. to reduce the solvent content to about 35 percent. Water at 25°C. is added to raise the regenerated cellulose moisture content to 8 percent.

A continuous rotary co-current flow dryer fitted with a steam jacket is used to dry the regenerated cellulose. The dryer has a horizontal tubular contact area provided with paddles to provide mixing and mechanical movement through the dryer.

The regenerated cellulose and steam are fed to the dryer at rates of 810 and 350 pounds per hour, respectively. The steam jacket temperature is maintained at 188°C. Residence time in the dryer is about 1 to 2 minutes and effluent flake regenerated cellulose is at about 96°C. and contains about 12 percent water and 1 percent solvent.

We claim:

1. In a regenerated cellulose recovery process wherein (1) coated, softened, regenerated cellulose is comminuted, (2) the softener is removed leaving coated regenerated cellulose having open internal pores, (3) the coating is removed from the regenerated cellulose by flushing with a coating solvent, and (4) the regenerated cellulose is dried of coating solvent, the improvement wherein the regenerated cellulose is dried of coating solvent by contacting the regenerated cellulose having a solvent content of at least about 6 percent by weight at an elevated temperature with a gas stream containing an effective amount of water vapor to raise the regenerated cellulose water content to about 7 to 22 percent by weight and to reduce the coating solvent content of the regenerated cellulose.

2. The process of claim 1 wherein the coating solvent content of the regenerated cellulose is reduced to less than about 1 percent by weight.

3. The process of claim 2 wherein the regenerated cellulose is heated to about 30° to 100°C. during contact with the gas stream.

4. The process of claim 3 wherein the gas stream is heated and contains water vapor at a partial pressure within the bounds of lines AB, BC, CD, DE and EA of FIG. 2.

5. The process of claim 4 wherein the gas stream is nitrogen.

6. The process of claim 4 wherein external heat is also provided to assist in heating the solvent-ladden regenerated cellulose.

7. The process of claim 4 wherein the solvent is tetrahydrofuran.

8. The process of claim 1 wherein the gas stream is steam.

9. The process of claim 8 wherein external heat is also provided to assist in heating the solvent-laden regenerated cellulose.

10. The process of claim 8 wherein the solvent is tetrahydrofuran.

11. The process of claim 1 wherein the solvent content of the regenerated cellulose is reduced to less than about 50 percent prior to contacting the regenerated cellulose with the gas stream containing water vapor.

12. The process of claim 11 wherein the solvent content of the regenerated cellulose is reduced to less than about 50 percent by distributing the solvent-laden cellulose on a screen and passing a high-velocity stream of a gas through the cellulose to entrain and remove solvent.

13. The process of claim 11 wherein the regenerated cellulose is heated to about 30° to 100°C. during contact with the gas stream containing water vapor.

14. The process of claim 13 wherein the gas stream is heated and contains water vapor at a partial pressure within the bounds of lines AB, BC, CD, DE and EA of FIG. 2.

15. The process of claim 13 wherein the gas stream is steam.

16. The process of claim 11 wherein liquid water is added to regenerated cellulose having a solvent content less than about 50 percent.

17. In a regenerated cellulose recovery process wherein (1) coated, softened, regenerated cellulose is comminuted, (2) the softener is removed leaving coated regenerated cellulose having open internal pores, (3) the coating is removed from the regenerated cellulose by flushing with a coating solvent, and (4) the regenerated cellulose is dried of coating solvent, the improvement wherein the regenerated cellulose is dried of coating solvent by contacting the regenerated cellulose having a solvent content of at least 6 percent by weight with steam to raise the regenerated cellulose water content to about 7 to 22 percent by weight and to reduce the coating solvent content of the regenerated cellulose to less than about 1 percent by weight.

18. The process of claim 17 wherein the solvent content of the regenerated cellulose is reduced to less than about 50 percent prior to contacting the regenerated cellulose with the gas stream containing water.

19. The process of claim 18 wherein liquid water is added to the regenerated cellulose prior to contacting the regenerated cellulose with the steam.

20. The process of claim 19 wherein external heat is also provided to assist in heating the solvent-laden regenerated cellulose during contact with the steam.

21. The process of claim 20 wherein the solvent is tetrahydrofuran.

* * * * *